United States Patent [19]

Hasenkamp

[11] Patent Number: 4,744,531
[45] Date of Patent: May 17, 1988

[54] ARRANGEMENT FOR COMMINUTING SCRAP IN RIBBON OR STRIP FORM FROM, FOR EXAMPLE, STEEL PLATE

[75] Inventor: Friederich Hasenkamp, Nettetal, Fed. Rep. of Germany

[73] Assignee: Metallverarbeitung Breyell-Dinslaken GmbH, Nettetal, Fed. Rep. of Germany

[21] Appl. No.: 34,177
[22] PCT Filed: Nov. 26, 1986
[86] PCT No.: PCT/DE86/00480
§ 371 Date: Mar. 31, 1987
§ 102(e) Date: Mar. 31, 1987
[87] PCT Pub. No.: WO87/03231
PCT Pub. Date: Jun. 4, 1987

[30] Foreign Application Priority Data

Nov. 28, 1985 [DE] Fed. Rep. of Germany ....... 3541984

[51] Int. Cl.[4] .............................................. B02C 18/24
[52] U.S. Cl. ................................. 241/101.2; 241/224; 241/235; 241/290
[58] Field of Search ................. 83/491, 492, 493, 494, 83/497; 241/235, 236, 224, 101.2, 293, 294, 230, 231, 232, 233, 234, 289, 290

[56] References Cited

U.S. PATENT DOCUMENTS 773,479 10/1904 Cornell ........................... 241/235 X
3,199,798 8/1965 Turner ............................ 241/235 X

FOREIGN PATENT DOCUMENTS 564362 11/1932 Fed. Rep. of Germany .
827620 2/1952 Fed. Rep. of Germany ...... 241/235
812172 5/1937 France .
860091 1/1941 France .
967023 10/1950 France ............................ 241/235
1524390 5/1968 France .
2122529 1/1984 United Kingdom .

Primary Examiner—Mark Rosenbaum
Attorney, Agent, or Firm—Jordan and Hamburg

[57] ABSTRACT

Apparatus for comminuting scrap in ribbon or strip form from, for example, steel plate into short sections attains a reduced-noise comminuting arrangement of simple construction, and also processes materials of different thicknesses without any readjustment, the apparatus having with two rotors which are driven synchronously in opposite directions and each having knives which project at the periphery of the rotors and which, when they meet, carry out a shearing cut, and moreover with two mutually meshing toothed wheels for driving the knife rotors mounted on shafts so that they cannot twist and with a fixed distance between axes, one of the toothed wheels being seated on the shaft of the first rotor and driving this shaft while the other is freely rotatably mounted on the shaft belonging to the second rotor and drives this shaft over a driving mechanism elastically supported in the direction of rotation.

12 Claims, 2 Drawing Sheets

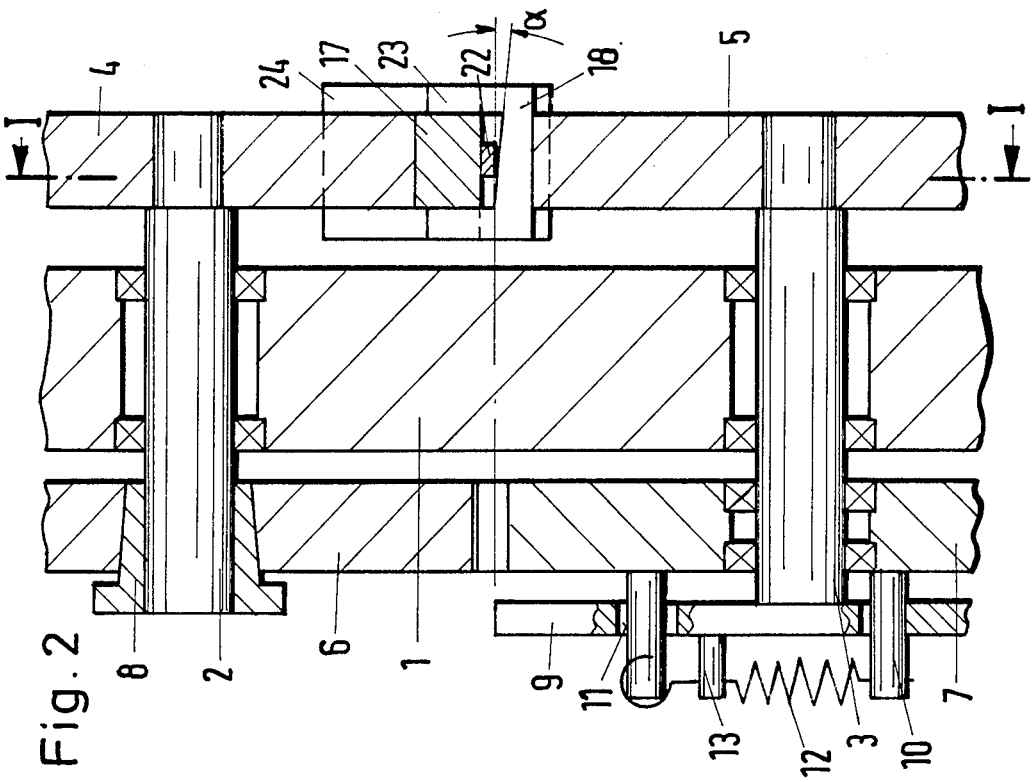
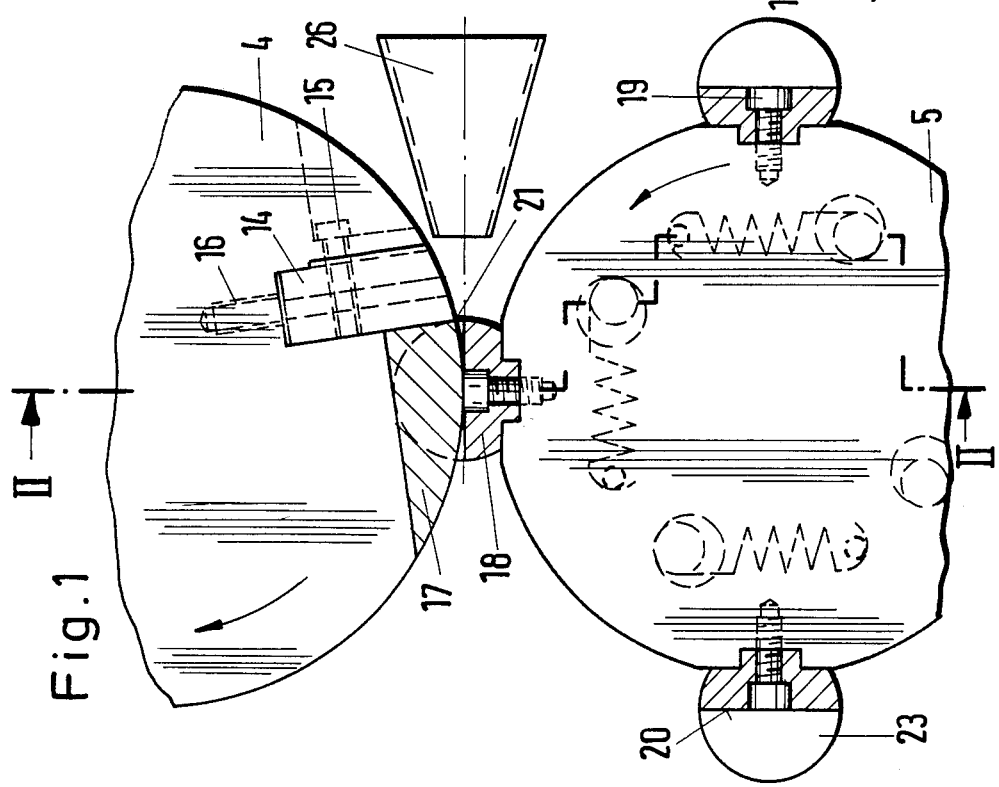

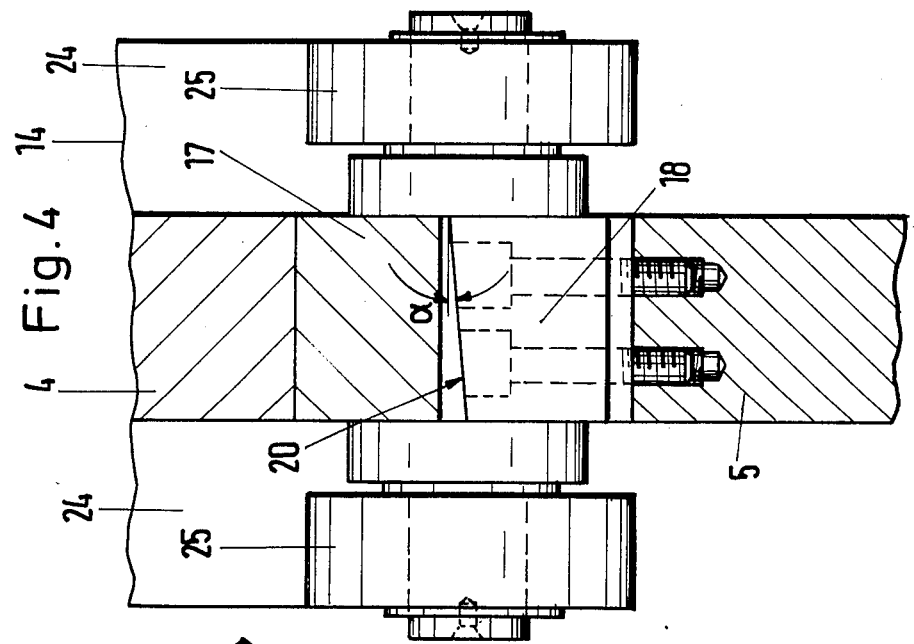
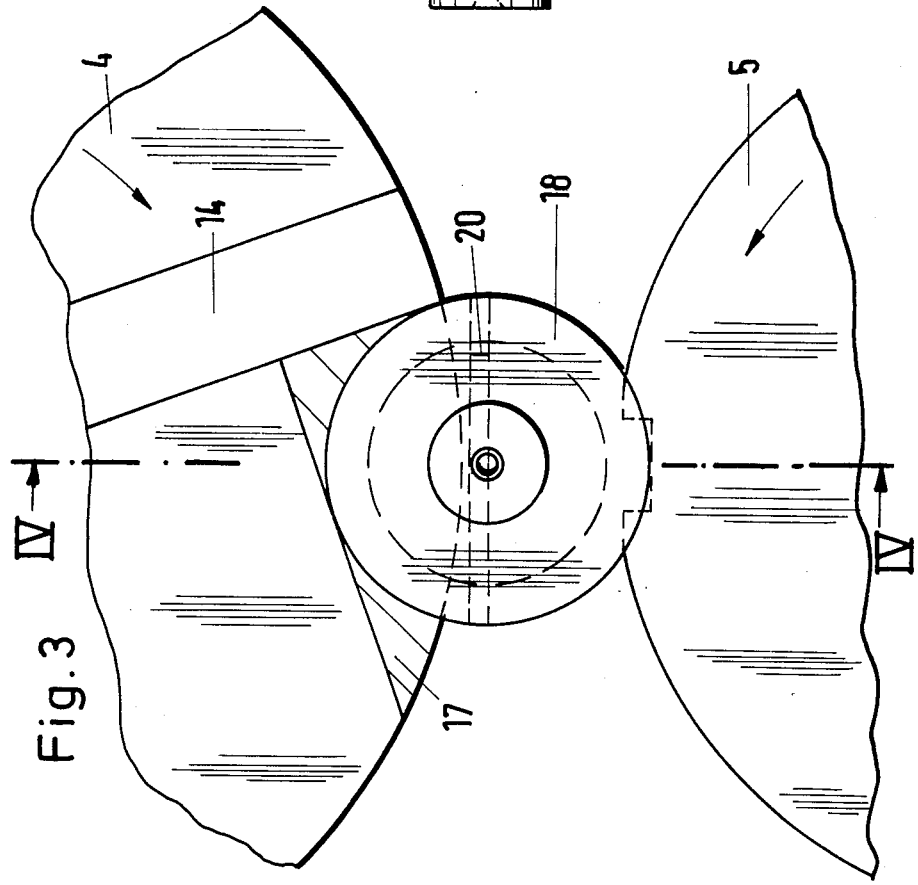

ARRANGEMENT FOR COMMINUTING SCRAP IN RIBBON OR STRIP FORM FROM, FOR EXAMPLE, STEEL PLATE

The invention relates to an arrangement for comminuting scrap in ribbon or strip form, for example, from steel plate, into short sections. Such scrap or waste strips are obtained, for example, in splitting, trimming, stamping, etc. installations.

Previously known comminuting arrangements for such ribbon- or strip-shaped scrap have a rotor, which is equipped at its periphery with several tools, for example, with four knives, and which works together with a stationary counterknife. The scrap is comminuted into short sections, in each case by knocking off the section from the ribbon or strip. This is associated with much noise and therefore frequently, no longer permitted by the authorities today from the point of view of noise protection. In these cases, there has already been a changeover to rolling up and tying off the ribbons or strips, obtained as scrap, and to dispose of them as so-called scrap coils. This is, however, associated with a considerable expense for equipment, handling, storage and transport for the plants, in which this scrap is obtained.

It is therefore a primary object of the invention to provide a noise-reduced comminuting arrangement for the ribbon- or strip-shaped scrap in question, which moreover, while of simple construction, can also process materials of different thickness without any readjustment.

The comminuting arrangement of the invention operates very quietly owing to the fact there no longer is any knocking off or chopping off, but rather a shearing off with a shearing cut. An almost silent operation can be achieved by means of the advantageously provided holding-down cushion. No readjustment of the knives is required for different material thicknesses, for example, from 0.5 to 5 mm, since the cutting gap is adjusted automatically to the respective ribbon thickness. Moreover, owing to the fact that the knives unroll in opposite directions and produce a shearing cut, they sharpen one another so that their serviceable life is long. Moreover, the knives can be exchanged and reground (circular grinding machine) easily. The knives need not be adjusted individually; rather, by loosening the conical adapter bushing and turning the first rotor, an adjustment equally accurate for all knives is achieved.

The object of the invention is described in greater detail below by means of an example of the operation shown in the accompanying drawings.

BRIEF DESCRIPTION OF THE DRAWINGS

FIG. 1 is a partially cut away view of the comminuting arrangement taken approximately along the line I—I of FIG. 2;

FIG. 2 is a cross sectional view taken approximately along the line II—II of FIG. 1;

FIG. 3 is a partial view similar to that of FIG. 1 but on an enlarged scale of a modified embodiment; and FIG. 4 is a cross sectional view taken approximately along the line IV—IV of FIG. 3.

DESCRIPTION OF THE PREFERRED EMBODIMENTS

In a housing part or support means 1, two shafts 2 and 3 are rotatably supported with a fixed distance between axes. On the shafts 2, 3, which are disposed parallel to one another and preferably, as shown, vertically on top of one another with their axes in horizontal alignment, two disk-shaped rotors 4 and 5 are mounted so that they cannot twist, the upper shaft 2 of the drawing carrying the first rotor 4 and the lower shaft 3 of the drawing the second rotor 5. The two rotors 4, 5 are disposed coplanar to one another and are driven synchronously to rotate in opposite directions (in the directions of the arrows of FIG. 1).

The two rotors 4, 5 are driven over two meshing toothed wheels or gear wheels 6 and 7, of which the toothed wheel 6, which drives the first rotor 4, is seated on shaft 2 so that it cannot twist and is driven directly by an electric motor or hydraulic motor or is coupled to and driven by the equipment producing the scrap strip. For securing the toothed wheel 6 on shaft 2, an easily detachable conical adapter bushing 8 is preferably provided, so that, after this bushing is loosened, the rotor 4 can be adjusted in the circumferential direction relative to the rotor 5 and also fixed once again in the set position rapidly and easily.

The toothed wheel 7, which meshes with the toothed wheel 6 and drives the second rotor 5, is mounted freely rotatably on the shaft 3 and drives this over a driving plate 9, which is connected with the shaft 3 so that it cannot twist. For this purpose, axially projecting bolts 10 are provided at a side face of the toothed wheel 7. These bolts 10 reach through the openings 11 in the driving plate 9, which is coaxial with toothed wheel 7, with sufficient play, so that limited relative movement with respect to the common direction of rotation can take place between the toothed wheel 7 and the driver plate 9 and thus between the toothed wheel 7 and shaft 3. Over springs 12, which at one end act upon bolt 10 and at the other end act upon the stop bolt 13 projecting from the driving plate 9, the toothed wheel 7 and the driving plate 9 are mutually braced and supported elastically in such a manner, that a displacement in the angle of rotation, coming from the rotor 5 in a manner yet to be described below in greater detail and the thus triggered relative movement between the driving plate 9 and the toothed wheel 7 in each case are absorbed elastically and compensated for.

At the periphery of the first rotor 4, several flat knives 14 are detachably mounted, for example, screwed on with locking screws 15 and pressure screws 16. Before each flat knife 14 in the direction of rotation, there is mounted advantageously in each case a holding-down cushion 17, which consists of rubber, plastic, etc. and therefore is elastic, which has the width or thickness of the rotor 4 and forms a circumferential area of the rotor 4 before the respective flat knife.

At the periphery of the second rotor 5, a number of circular knives 18, corresponding to the number of flat knives 14 on the first rotor 4, are detachably mounted, for example, by means of countersunk socket-head screws 19. The circular knives 18 form a cutting surface 20, which runs at right angles to the radius of the rotor 5 and which, together with the cutting edge 21 of the flat knife 14 on the rotor 4 running transversely to the direction of rotation, produces a closing cutting gap and thus a shearing cut for shearing off a scrap strip 22 in the gap. To achieve a pulling shearing cut, the cutting surface 20 of the round knives 18, as can be seen from FIG. 2, is provided with an inclined gradient converging to the axis of the rotor 5, so that a cutting angle $\alpha$ of, for example, 8° results between the cutting edge 21 of the flat knife 14 and the cutting surface 20 of the circular knife 18.

Advisably, four flat knives 14 are provided at the first rotor 4 and, correspondingly, also four circular knives 18 at the second rotor 5, which in each case act in concert with one another, so that four cuts take place for each revolution of the knife rotors 4, 14 and 5, 18. Depending on the diameter of the knife rotors and the desired length of the sections severed from the scrap ribbon or strip, the rotors may also be equipped with a larger or smaller number of knives, the number of flat knives and the number of circular knives of course being the same.

The circular knives 18 on the second rotor 5 are provided at the side with stop supports protruding over their cutting surface 20, which ensure that the associated flat knife 14 is supported at the circular knife before and during the cutting operation and moves with a relative motion along the rear side of the circular knife, when the two knives 14, 18, as a consequence of the rotors 4, 5 revolving in opposite directions, meet in motion in the same direction. In the versions of FIGS. 1 and 2, the stop supports are formed by semicircular fixed projections 23 which stand up above the cutting surface 20 of the circular knives 18 and along which the associated flat knife 14 with lateral projections 24 slides regionally before and during the cutting operation. In the version of FIGS. 3 and 4, the stop supports are formed by rollers 25, which are mounted freely rotatably at the sides of the circular knives 18 and on which the associated flat knife 14 with the lateral projections 24 rolls off, so that there is no sliding friction at the stop supports. The rollers 25 may consist of steel or also of a strong plastic, which brings about a further damping of noise.

The arrangement functions as follows. The scrap ribbon 22, which is to be comminuted, is introduced over an appropriately provided feeder funnel 26 aligned approximately horizontally between the two knife rotors 4, 14 and 5, 18 and drawn in by their rotation between the knives 14, 18 and then sheared off in a shearing cut by the flat knife 14 of the first rotor 4 working against the circular knife 18 of the second rotor 5, as described above. The displacement in the angle of rotation between the rotor 4 and the rotor 5, resulting from the flat knife 14 running up against the circular knife 18, is absorbed and compensated for by the elastic support between the toothed wheel 7 and the driving plate 9, so that no die clearance arises between the two knives 14, 18. Moreover, due to the elastic compensation of the displacement in the angle of rotation arising as the flat knife 14 of the first rotor 4 comes up against the circular knife 18 of the second rotor 5, scrap ribbons 22 ranging in thickness from, for example, 0.5 to 5 mm, are sheared off without requiring a resetting of the knives at the rotors.

Due to the shearing cut that takes place, and in conjunction with the holding-down cushions 17, which are disposed ahead of the the flat knives 14 at the first rotor 4, which serve to move up the scrap strip as well as to hold down scrap section, an almost soundless cut is produced.

I claim:

1. Apparatus for comminuting scrap in ribbon form comprising a support means, first and second shafts rotatably mounted on said support means, a first rotor fixed to said first shaft, a second rotor fixed to said second shaft, first knife means mounted on and extending to the periphery of said first rotor, second knife means mounted on and extending to the periphery of said second rotor such that upon rotation of said first and second rotors synchronously in opposite directions, said first and second knife means are moved to a juxtaposed and mutually cooperable position to effect cutting of said scrap, a first gear wheel disposed on said first shaft, first mounting means mounting said first gear wheel on said first shaft to preclude relative rotation between said first gear wheel and said first shaft, a second gear wheel disposed on said second shaft so as to be rotatable relative to said second shaft, and an elastic driving means between said second gear wheel and said second shaft which elastically connects said second gear wheel to said second shaft.

2. Apparatus according to claim 1, wherein a plurality of said first knife means are equally spaced about the periphery of said first rotor and a like number of second knife means are equally spaced about the periphery of said second rotor.

3. Apparatus according to claim 1, wherein said first knife means comprises a flat knife and said second knife means comprises a circular knife.

4. Apparatus according to claim 3, wherein said circular knife has an inclined cutting surface which is inclined relative to the axis of said second rotor.

5. Apparatus according to claim 4, wherein said circular knife has side stop supports projecting from the sides of said cutting surface and projecting radially outwardly of said cutting surface such as to be disposed on either side of said flat knife when in said juxtaposed and mutually cooperable position.

6. Apparatus according to claim 5, wherein said side stop supports are in the form of semicircular projections.

7. Apparatus according to claim 3, wherein said circular knife comprises stop supports in the form of rollers rotatably mounted on said circular knife, said flat knife rolling off of said rollers before and during the cutting operation.

8. Apparatus according to claim 1, wherein said elastic driving means comprises a driving plate fixed to said second shaft, said driving plate being coaxial with said second gear wheel, a plurality of spaced openings in said driving plate, a plurality of projections projecting laterally from said second gear wheel and projecting into said openings to provide for limited relative rotational movement between said driving plate and said second gear wheel, said elastic driving means further comprising spring means extending between said projections and said driving plate such that said spring means provide an elastic connection between said driving plate and said second gear wheel.

9. Apparatus according to claim 8 further comprising second projections projecting laterally from said driving plate, said spring means being connected to said second projections.

10. Apparatus according to claim 1, wherein said first knife means comprises a flat knife and a resilient holding-down member juxtaposed to and ahead of said flat knife in the direction of rotation of said first rotor.

11. Apparatus according to claim 1, wherein said first mounting means comprises a conical adapter bushing for adjusting the position of said first gear wheel on said first shaft.

12. Apparatus according to claim 1 further comprising a feeder funnel for aligning strips of scrap being fed to said first and second rotors.

* * * * *